United States Patent [19]

Hutzler et al.

[11] Patent Number: 5,408,919
[45] Date of Patent: Apr. 25, 1995

[54] BASTER

[75] Inventors: Lawerence Hutzler, Canaan, Conn.; Paul Heling, Solingen-Wald, Germany

[73] Assignee: Hutzler Manufacturing Company Inc., Conn.

[21] Appl. No.: 176,545

[22] Filed: Dec. 30, 1993

Related U.S. Application Data

[63] Continuation-in-part of Ser. No. 25,070, Feb. 3, 1993, abandoned.

[51] Int. Cl.⁶ .............................................. A47J 37/10
[52] U.S. Cl. .......................................... 99/345; 222/79
[58] Field of Search ................... 99/345, 532; 222/79; 124/65; 239/526

[56] References Cited

U.S. PATENT DOCUMENTS

| 2,432,073 | 12/1947 | Hargen | 99/345 X |
| 2,887,035 | 5/1959 | De Seversky | 99/345 X |
| 2,937,813 | 5/1960 | Rinkewich | 239/526 |
| 2,991,945 | 7/1961 | Rosenkranz | 239/526 |
| 3,656,351 | 4/1972 | Raczak | 222/79 X |
| 3,836,057 | 9/1974 | MacManus | 222/79 X |
| 4,129,066 | 12/1978 | Corley | 99/345 |

Primary Examiner—David A. Scherbel
Assistant Examiner—Patrick F. Brinson
Attorney, Agent, or Firm—Michael J. Striker

[57] ABSTRACT

A baster comprises a cylinder for taking and accommodating gravy and the like, a piston reciprocatingly movable in the cylinder so as to produce a suction to suck gravy and the like into the cylinder and then to pump the gravy and the like from the cylinder, and a handle connected with the cylinder only in two points which are spaced from one another in an axial direction of the cylinder so that an elongated slot remains between the cylinder and the handle.

17 Claims, 2 Drawing Sheets

BASTER

CROSS-REFERENCE TO RELATED APPLICATIONS

This application is a continuation-in-part of application Ser. No. 025,070, filed on Feb. 3, 1993 now abandoned.

BACKGROUND OF THE INVENTION

The present invention relates generally to basters.

Basters to be used during cooking are well known. The known baster includes a tube for taking gravy or the like, and a rubber member compressible by a user so as to create a suction and to suck gravy into the tube, for subsequent discharge onto turkey, chicken and the like during cooking. The disadvantage of the known basters is that the gravy is sucked all the way through the tube and into the rubber member, and after multiple use remains in the rubber member and contaminate it. It is believed to be clear that such contamination is not desirable. It requires thorough cleaning of the baster, and in many cases the traces of the gravy in the rubber member even after cleaning.

Also, in the known basters when the gravy is taken into the device and then held in its gravy holding receptacle, the suction is usually not sufficient to hold the gravy inside the device and the gravy drips from it.

Some devices of this general type are disclosed in U.S. Pat. Nos. 2,432,073, 2,887,035, .2,937,813, 2,991,945, 3,656,351, 3,836,057, 4,29,066. These devices can be further improved.

SUMMARY OF THE INVENTION

Accordingly, it is an object of the present invention to provide a baster which eliminates the disadvantages of the prior art and is a further improvement of the existing basters.

In keeping with these objects and with others which will become apparent hereinafter, one feature of the present invention resides, briefly stated, in a baster which has a passage forming means for taking and accommodating of gravy and the like and a suction forming means for creating a suction in the passage, wherein the passage forming means includes a cylinder, and the suction forming means includes a piston movable in the cylinder, and a handle connected with the cylinder in two points spaced from one another in an axial direction of the cylinder so that an elongated axially extending slot remains between the cylinder and the handle.

When the baster is designed in accordance with the present invention, during the manufacture of the baster the cylinder and the handle are not connected with one another over a large area and therefore deformations of the cylinder during the manufacture such as for example shrinkage are avoided. This is of exceptional importance for the manufacture of the baster, since the cylinder must be produced with high accuracy in order to avoid untightness between the piston movable in the cylinder and the inner surface of the cylinder. With even a slight untightness, the product to be delivered can pass in a gap between the cylinder and the piston.

In accordance with another advantageous feature of the present invention, a rear wall of the cylinder is provided with passage means formed to prevent formation of a negative pressure behind the piston during movement in a forward stroke, which negative pressure renders resistance to the advancement of the piston, wherein the passage means are formed by a plurality of openings arranged circumferentially around an axis of the cylinder at a radial distance from the axis. The passage means formed by the above specified plurality of openings provide for optimal communication of the space behind the piston with a surrounding atmosphere and completely eliminate the negative pressure formation.

In accordance with still a further feature of the present invention, the baster is provided with a long pipe which guides the product to be delivered from the cylinder, wherein the pipe is connected with the cylinder so that a rear end of the pipe is tightly fitted on a forwardly extending projection of the cylinder in a removable manner. This substantially simplifies removal of the pipe for cleaning purposes and its further mounting to the cylinder. Also, seals can be arranged in grooves provided on the forward projection of the cylinder so as to further improve the tightness between the rear end of the pipe and the front projection of the cylinder.

In accordance with still another advantageous feature of the present invention, the rear end of the pipe has a diameter greater than the remaining portion of the pipe, so that a shoulder is formed between the two portions of the pipe against which the front face of the forward projection of the cylinder abuts after mounting.

The piston can be composed of two plastic parts connected with one another and forming wiping lips which tightly abut against an inner surface of the cylinder, to provide required tightness.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figures 1, 2:
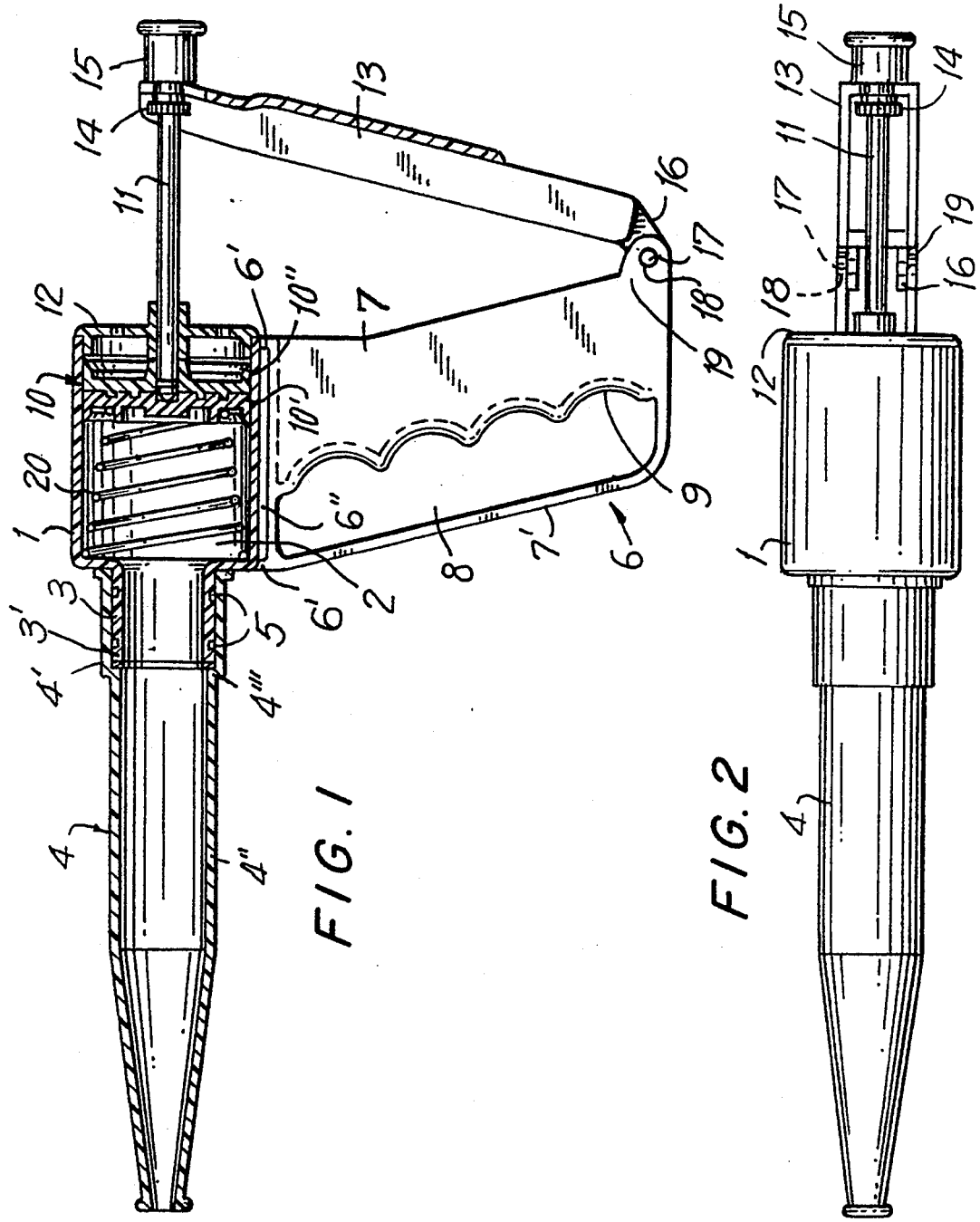
FIG. 1 is a side view of the baster in accordance with the present invention.
FIG. 2 is a plan view of the baster in accordance with the present invention.

The baster in accordance with the present invention has a unit which forms a passage for taking and accommodating gravy and the like. The passage forming unit includes a cylinder which is identified with reference numeral 1 and forms an inner chamber 2. A forward projection formed as a sleeve 3 projects forwardly from the cylinder 1. An elongated delivery pipe 4 is fitted on the sleeve 3 tightly, in a force-transmitting manner for example by clamping of the pipe 4 on the sleeve 3 with interposition of seals 5. The volume of the cylinder 1 is equal to or greater than the volume of the pipe 4.

Such a connection allows easy mounting of the pipe 4 on the sleeve 3 for operation of the baster, and dismounting of the pipe from the sleeve for cleaning the baster.

As can be seen in the drawings, the pipe 4 has a rear portion 4' which is fitted on the sleeve 3, and a front portion 4" extending forwardly from the rear portion. The rear portion 4' has a greater diameter than the front portion, so that a shoulder 4''' is formed between these portions. When the pipe is fitted on the sleeve 3, the front end 3' of the sleeve 3 abuts against the shoulder 4" of the pipe 3.

The cylinder 1 is arranged on a handle 6 which in the drawings extends downwardly of the cylinder. The handle 6 is connected to the cylinder 1 only in two points 6" which are spaced from one another in an axial direction of the cylinder. Therefore a longitudinal slot 6" is formed between the cylinder and the handle. During the manufacture of the baster, in which the cylinder and the handle are composed of a plastic material, the cylinder 1 is not subjected to deformations due to a substantially large-surface connection with the handle as in known constructions, and therefore the shrinkage of the cylinder does not occur and the cylinder is produced with high accuracy, especially with respect to the shape and size of its inner cylindrical opening in which a piston is displaced as will be explained hereinbelow.

The handle 6 has a grasping part to be grasped by a user's hand, a front straight part 7', and a recess 8 provided with a plurality of curved recessed portions 9. The recessed portions 9 are formed to correspond anatomically to fingers of the user, when the user inserts the fingers in the opening 8 and grasps the portion 7.

The cylinder 1, the sleeve 3 and the handle 6 are formed as a single one-piece element composed of thermoplastic material. This substantially facilitates the manufacture of the baster.

A unit is further provided with means for producing suction in the cylinder 1 and the pipe 4. This unit includes a piston 10 which is reciprocatingly movable in the chamber 2 of the cylinder 1 and has a piston rod 11. The piston 10 is formed as will be described below, so as to be sealed relative to the cylinder 1. The piston rod 11 extends through a cover 12 which is removably connected with the cylinder 1, for example by a thread or the like. A lever 13 has an upper end which is connected with the rear end of the piston rod 11. The connection can be performed, for example, by a slot. The position of the upper end of the lever 13 on the piston rod 11 is locked by a nut 14 and a limiting knob 15. The lower end of the lever 13 is pivotally connected with the handle 6. For this purpose the lower end of the lever 13 has a forked projection 16 provided with two pins 17 which pivotally engage in holes 18 of a fork projection 19 provided on the lower rear end of the handle 6.

During the operation the user holds the handle 8 and presses the lever 13 toward the handle member 7. As a result, the piston 10 is displaced forwardly to the front or left end of the cylinder 1. A spring 20 is arranged inside the chamber 2 of the cylinder 1 and abuts with its one end against a shoulder formed between the cylinder 1 and the sleeve 3 and with its another end against the front surface of the piston 10.

Figure 3:
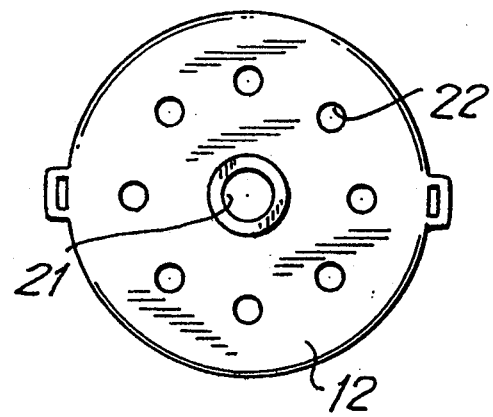
FIG. 3 is a view showing a rear end of a cylinder of the inventive baster.

As can be seen from FIG. 3, the cover 12 which closes the rear open end of the cylinder 1 has first passage means which are formed as a central opening 21 for passing the piston rod 11 therethrough and second passage means which are formed by a plurality of openings 22. The openings 22 are located on a common circumference around a central axis of the piston and around the central opening 21 at the same radial distance from the central axis. During the piston displacement a negative pressure in the chamber located behind the piston or in other words at the right side of the piston in the drawings, is not formed since air is freely aspirated through the openings 22 into this chamber. The front end of the pipe 4 is introduced into a gravy receptacle. The user releases the lever 13, and the lever under the action of the spring 20 springs back and displaces the piston rod 11 with the piston 10 rearwardly so as to produce suction in the cylinder 1. Under the action of suction the gravy is aspirated into the pipe 4, the sleeve 3 and the cylinder 1. The baster is withdrawn from the gravy receptacle, and thereafter the user again presses the lever 13 toward the handle 6 to discharge the gravy onto turkey, chicken or other product which is being cooked.

In order to clean the inventive baster, a cleaning medium can be aspirated into the chamber 1 and discharged several times. It is also possible to remove the pipe 4 from the sleeve 3, the seals 5 from the sleeve 3, and the cover 12 from the cylinder 1, for cleaning. Thus, the cleaning of the device is simple and efficient. The device also can be cleaned so that no contamination residues remain in it. While the gravy is sucked into the device it is reliably held under the action of substantial suction force produced by the device, and does not drip from the pipe 4.

Figure 4:
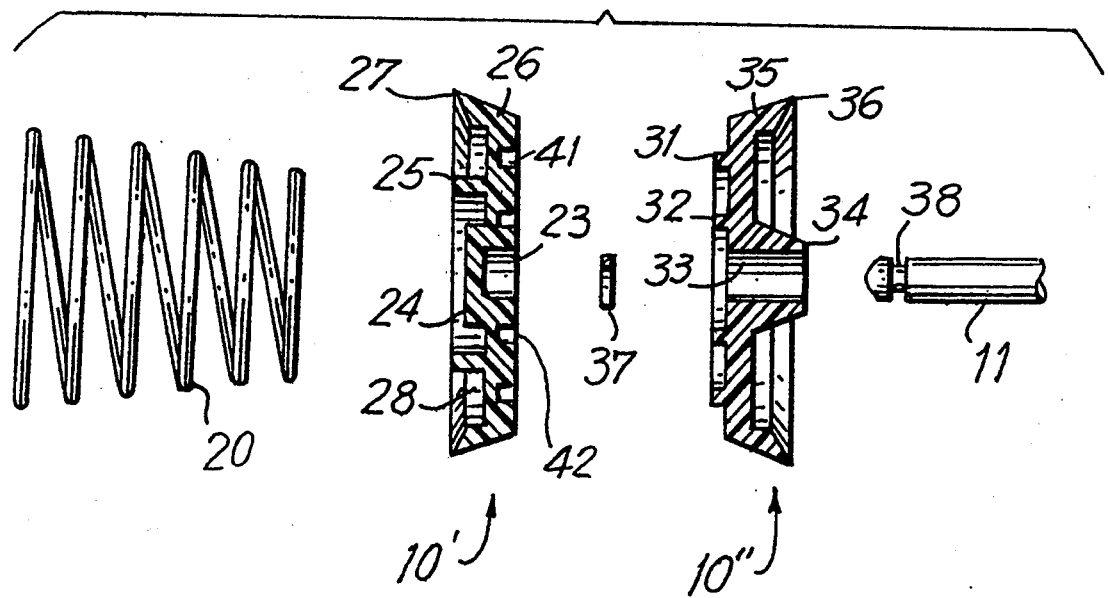
FIG. 4 is an exploded view of several parts of the inventive baster.

As can be seen from FIG. 4 the piston 10 has two disc-shaped piston parts 10' and 10". The piston part 10' has two annular grooves 21 and 22 of different diameters and a central blind hole 23 in its right side in the drawing. At the left side the piston part 10" has a central projection 24 in which the blind hole 23 is formed, a collar 25 having a greater diameter and finally a peripheral collar 26 with a narrowing lip 27. The piston part 10' is provided with two annular projections 31 and 32 in its left side and a central throughgoing opening 33. At the right side it has a projection 34 in which a main part of the central opening 33 is formed, and a peripheral collar 35 with a narrowing lip 36. The peripheral collars 27 and 35 have outer conical surfaces. The piston parts 10' and 10" are composed of a synthetic plastic material, for example of an elastomer. They are spin-welded together with an E-ring 37 engaging in a groove 38 of the shaft 1 and holding them in a position on the shaft. The spring 20 is formed as a conical spring and its right end of a smaller diameter fits over the collar 25 of the piston part 10' in assembled condition. In this condition when the spring 20 is completely compressed, it is inserted in a depression 28 formed between the collar 25 and the collar 26 of the piston part 10' so that it does not take up any additional space inside the cylinder. The collar 25 has an axial length which is greater than the axial length of the collar 26 so that it extends to the left axially beyond the collar 26. In turn, the collar 34 has an axial length which is greater than the axial length of the collar 35 and extends to the right axially beyond the collar 35. Therefore in the end positions of the piston the collars 34 and 25 act as shock absorbing members to prevent damage to the lips 27 and 36 of the piston portions. In the assembled condition the collars 26 and 35 are somewhat radially compressed so as to tightly abut against the inner surface of the cylinder and to prevent any untightness. At the same time the lips 27 and 36 wipe the inner surface of the cylinder during forward and rearward strokes.

The operation of the baster in accordance with the present invention is simple, easy and efficient for its intended purpose.

It will be understood that each of the elements described above, or two or more together, may also find a useful application in other types of constructions differing from the types described above.

While the invention has been illustrated and described as embodied in a baster, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A baster, comprising a cylinder for taking and accommodating gravy and the like, a piston reciprocatingly movable in said cylinder so as to produce a suction to suck gravy and the like into the cylinder and then to pump the gravy and the like from the cylinder; and a handle connected with said cylinder only in two points which are spaced from one another in an axial direction of said cylinder said handle being spaced from said cylinder except at said connecting points so as to form a one-piece member with an elongated slot between said cylinder and said handle and thereby deformations of said cylinder during manufacture of the baster are avoided.

2. A baster as defined in claim 1; and further comprising a sleeve extending forwardly from said cylinder of one piece with the latter, and a pipe releasably and tightly connectable with said sleeve.

3. A baster as defined in claim 2, and further comprising sealing means arranged between said pipe and said sleeve.

4. A baster as defined in claim 2, wherein said pipe has a rear cylindrical portion which is tightly fitted over said sleeve.

5. A baster as defined in claim 4, wherein said pipe has another forwardly extending portion, said cylindrical end portion having a diameter which is greater than a diameter of said forward portion so as to form a shoulder therebetween, said sleeve has a front face which in a mounted condition of said pipe abuts against said shoulder.

6. A baster as defined in claim 2, wherein said pipe has a predetermined volume, said cylinder having an inner chamber with a volume which is greater than the volume of said pipe.

7. A baster as defined in claim 4, wherein said pipe has another forwardly extending portion, said cylindrical end portion having a diameter which is greater than a diameter of said forward portion so as to form a shoulder therebetween, said sleeve has a front face which in a mounted condition of said pipe abuts against said shoulder.

8. A baster as defined in claim 1, wherein said pipe has a predetermined volume, said cylinder having an inner chamber with a volume which is greater than the volume of said pipe.

9. A baster as defined in claim 1, wherein said cylinder has a front end through which the gravy and the like is dischargeable and a rear end with a space therebetween which is subdivided by said piston into a front chamber located between said piston and said front end and a rear chamber located between said piston and said rear end, so that the gravy and the like is sucked into said front chamber and then pumped out from said front chamber, said rear chamber being rearwardly open; and further comprising a cover which closes said rear chamber and is provided with passage means for passing air.

10. A baster as defined in claim 1, wherein said handle has a front straight part and a rear grasping part to be grasped by a user's hand and forming a recess between said parts, said recess being provided with a plurality of curved, recessed portions shaped in accordance with a shape of fingers of the user so that the user's fingers can engage said recessed portions of said grasping part and be limited forwardly by said straight parts.

11. A baster as defined in claim 1, wherein said piston is composed of two disc-shaped piston parts which are connected with one another and having peripheral collars which are inclined in opposite directions and form wiping lips, so that in an assembled condition said peripheral collars are radially compressed and tightly abut against an inner surface of said cylinder so as to provide tightness between said piston and said cylinder.

12. A baster, comprising a cylinder for taking and accommodating gravy and the like, a piston reciprocatingly movable in said cylinder so as to produce a suction to suck gravy and the like into the cylinder and then to pump the gravy and the like from the cylinder; and a handle connected with said cylinder only in two points which are spaced from one another in an axial direction of said cylinder said handle being spaced from said cylinder except at said connecting points so as to form a one piece member with an elongated slot between said cylinder and said handle, said piston being composed of two disc-shaped piston parts which are connected with one another and having peripheral collars which are inclined in opposite directions and form wiping lips, so that in an assembled condition said peripheral collars are radially compressed and tightly abut against an inner surface of said cylinder so as to provide tightness between said piston and said cylinder, one of said piston parts having at least one annular groove, wherein another of said piston parts has at least one annular projection engaging in said annular groove.

13. A baster, comprising a cylinder for taking and accommodating gravy and the like, a piston reciprocatingly movable in said cylinder so as to produce a suction to suck gravy and the like into the cylinder and then to pump the gravy and the like from the cylinder; and a handle connected with said cylinder only in two points which are spaced from one another in an axial direction of said cylinder said handle being spaced from said cylinder except at said connecting points so that an elongated slot remains between said cylinder and said handle, said cylinder and said handle together forming a one-piece member composed of a thermoplastic material, so that because of said elongated slot, during manufacture of said one-piece member composed of a thermoplastic material deformations of said cylinder are avoided.

14. A baster, comprising a cylinder for taking and accommodating gravy and the like, a piston reciprocatingly movable in said cylinder so as to produce a suction to suck gravy and the like into the cylinder and then to pump the gravy and the like from the cylinder; and a handle connected with said cylinder only in two points which are spaced from one another in an axial direction of said cylinder said handle being spaced from said cylinder except at said connecting points so as to form a one piece member with an elongated slot between said cylinder and said handle, said cylinder having a front end through which the gravy and the like is dischargeable and a rear end with a space therebetween which is subdivided by said piston into a front chamber located between said piston and said front end and a rear chamber located between said piston and said rear end, so that the gravy and the like is sucked into said front chamber and then pumped out from said front chamber, said rear chamber being rearwardly open; and a cover which closes said rear chamber and is provided with passage means for passing air, said passage means including a plurality of openings which are located around an axis of said cylinder at substantially equal distances from said axis to reliably prevent a negative pressure formation in said rear chamber.

15. A baster as defined in claim 12, wherein each of said piston parts has a inner collar having a diameter which is smaller than a diameter of said peripheral collar and extending axially beyond said peripheral collar so as to form a shock-absorbing member in end positions of said piston.

16. A baster as defined in claim 12 and further comprising a spring arranged inside said cylinder between a wall of said cylinder and one of said piston parts, said spring being formed as a conical spring having one end portion with a greater diameter and another end portion with a smaller diameter, said one end portion with a greater diameter abutting against the wall of said cylinder while said another portion of said smaller diameter being fitted on said inner collar of said one piston part, and in an assembled condition said spring as a whole is contained in a depression formed between said inner collar and said peripheral collar of said one piston part.

17. A baster as defined in claim 14, wherein said cover further comprises a central opening, said piston having a piston rod extending from said central opening, said openings of said passage means being located concentrically relative to said central opening.

* * * * *